United States Patent

[11] 3,603,873

| [72] | Inventor | Uldis Cirulis<br>Midland Park, N.J. |
|------|----------|--------------------------------|
| [21] | Appl. No. | 2,910 |
| [22] | Filed | Jan. 14, 1970 |
| [45] | Patented | Sept. 7, 1971 |
| [73] | Assignee | Nus Corporation<br>Rockville, Md. |

[54] CONDUCTIVITY SENSOR
14 Claims, 2 Drawing Figs.

[52] U.S. Cl. .................................................. 324/30 R,
324/65 R
[51] Int. Cl. ........................................... G01n 27/42
[50] Field of Search .......................................... 324/30 R,
30 A, 30 B, 65 R

[56] References Cited
OTHER REFERENCES

J. Williams— A Small Portable Unit for Making in situ Salinity and Temperature Measurements— Proc. of Instr. Soc. of America— V. 15, Pt.1— 1960— Copy in 324/30A E. Aagaard et al.— A Probe Type Induction Conductivity Cell— Marine Sciences Instrumentation— V.2— 1962— Copy in 324/30A

*Primary Examiner*—Michael J. Lynch
*Attorney*—Samuelson & Jacob

ABSTRACT: A conductivity sensor having a fluid immersible, conductivity transformer comprised of a pair of toroidal cores on each of which are wound two windings, one of the windings on one core being the input winding, one of the windings on the other core being the output winding, the second winding on the input core providing a reference voltage and the second winding on the output core providing a means for negative feedback to null the flux in the second core. The output voltage and the reference voltages are compared to produce a measurement which is a function of the conductivity of the medium in which the conductivity transformer is immersed.

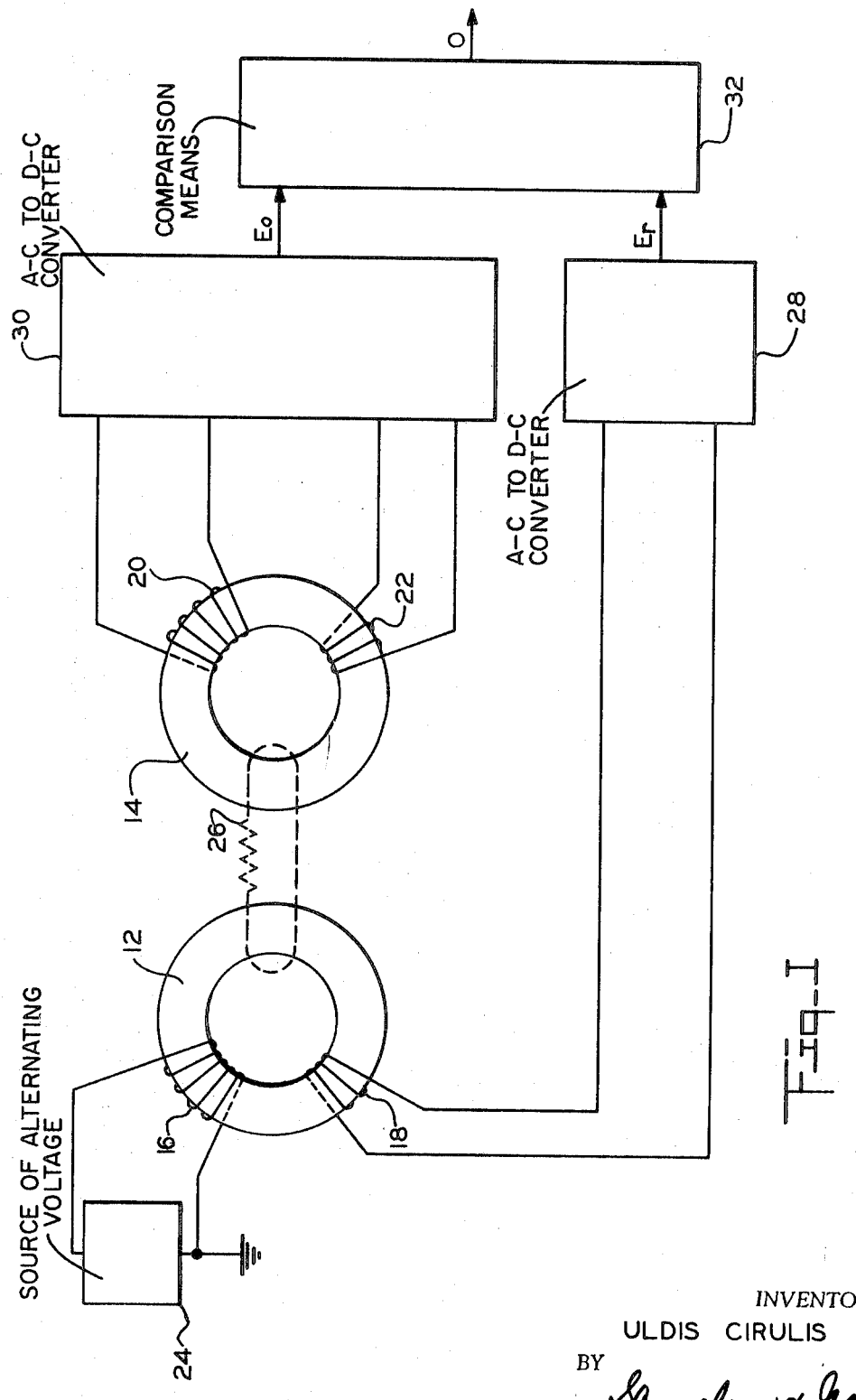

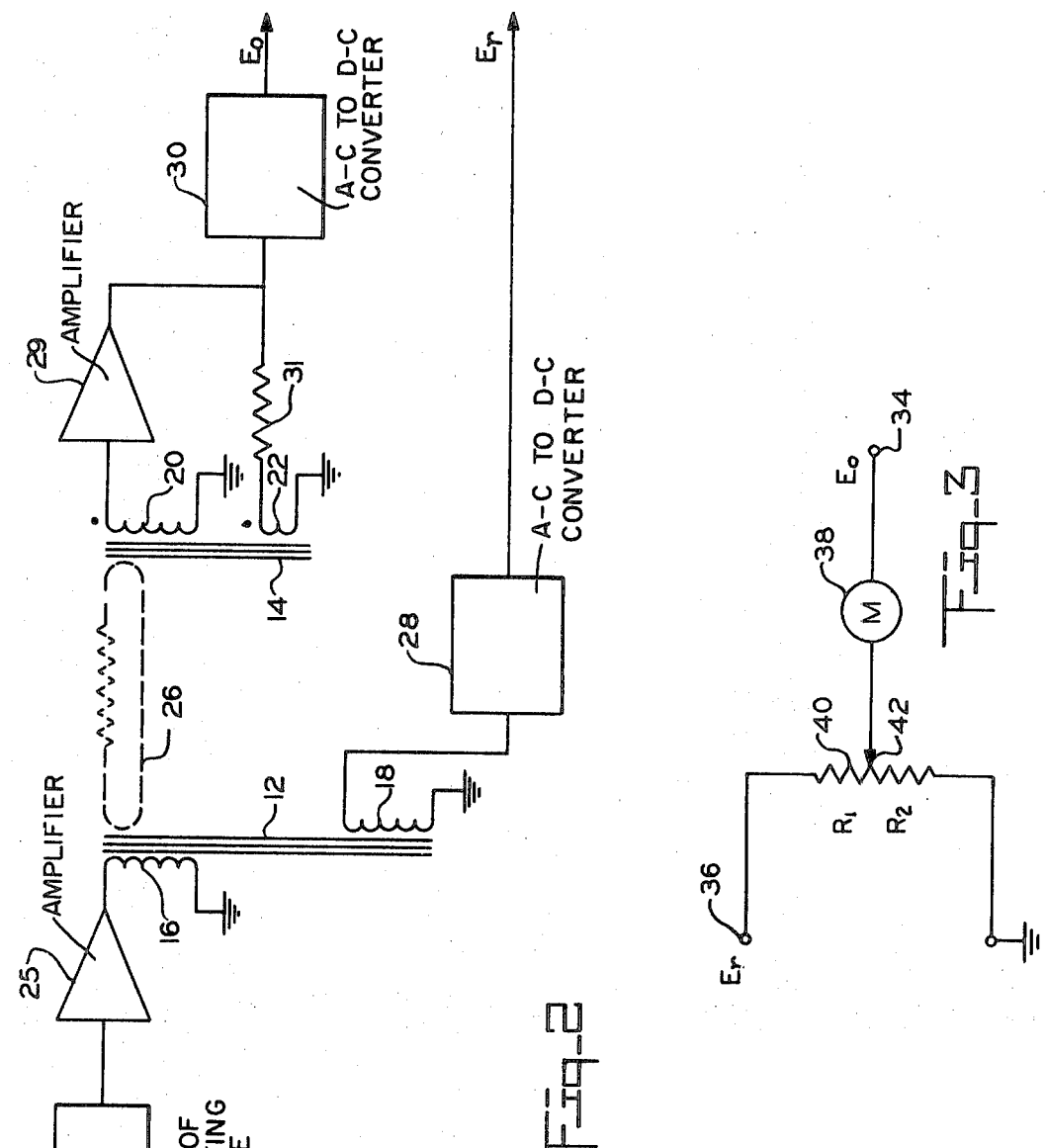

CONDUCTIVITY SENSOR

The invention relates to conductivity sensors for fluids and, in particular, to those conductivity sensors which utilize a pair of toroidal coils, which are immersed in the fluid whose conductivity is to be measured, as a conductivity transformer.

The use of a pair of toroidal coils for measuring the conductivity of a fluid is known in the prior art. However, these prior art devices possessed inherent disadvantage, in that, changes in the temperature of the fluid and/or other changes in one or both of the toroidal cores affected the measurements. There has been a need for this type conductivity sensor in which the effects of temperature and other changes in the characteristics of the measuring system are corrected so that the output indication, either analog or digital, meter, computer or oscilloscope will be proportional to the conductivity of the medium in which the toroidal cores are immersed.

Broadly, the invention comprises a conductivity transformer (pair of toroidal cores in juxtaposition) which is immersed in the medium. There are two windings wound on each of the cores. One of the windings on the first core is connected to a source of alternating voltage having frequency of the order of 1,000 Hertz. The second winding on the first core is connected to first conversion means whose output produces a reference voltage. One of the windings on the second core is connected to second conversion means through a high gain, inverting amplifier so that the alternating voltage induced in this winding through the coupling from the fluid medium is converted to an output voltage. The second winding on the second core is connected to the output of the high gain, inverting amplifier in such phase that the effect of the toroid's characteristics or the changes therein are balanced out and do not affect the output of the second conversion means. The reference voltage and the output voltage are compared to produce a signal which is a function of the conductivity of the medium.

It is an important object of the invention to provide a conductivity sensor of the toroidal coil type in which the characteristics of the core and the changes therein do not affect the measurement accuracy.

It is a further object of the invention to provide such a conductivity sensor wherein the characteristics of the toroidal core and the changes therein are balanced out by a feedback signal applied to a coil wound on the core.

These and other objects, advantages, features and uses will be apparent during the course of the following description when taken in conjunction with the accompanying drawings wherein:

FIG. 1 is a block diagram of the basic circuit of the conductivity sensor of the invention;

FIG. 2 is a more detailed block diagram of the basic circuit of the conductivity sensor of the invention; and FIG. 3 is a schematic diagram of a null-type comparator which may be used in the conductivity sensor of the invention.

In the drawings, wherein, for the purpose of illustration, are shown preferred embodiments of the invention, the numerals 12 and 14 designate a pair of toroidal cores which are formed of magnetic material and are mounted together as a conductivity transformer and immersed in the medium whose conductivity is to be measured. Since the type or style of mounting does not constitute a part of the invention, these details are not shown.

Toroidal core 12 is the input core and carries two windings 16 and 18. Toroidal core 14 is the output core and carries two windings 20 and 22. The winding 16 is the input winding which is connected to a source of alternating voltage 24 whose frequency (nominal 1,000 Hertz) and output voltage are preferably accurately controlled. The flow of current in winding 16 induces a current flow in coil 18 through coupling in core 12 and induces a current in coil 20, the output winding through coupling 26 due to the conductivity of the fluid medium (shown in dashed lines in the figures).

Winding 18 is connected to the input of an AC to DC converter 28 whose output is a reference voltage whose DC value is proportional to the AC input. Winding 20 is preferably connected through amplifier 29 (FIG. 2) to the input of an AC to DC converter 30 whose output is an output voltage whose DC value is proportional to the AC input. The voltage magnitude in winding 20 is a function of the conductance of the fluid medium so that the output voltage of converter 30 is also a function of the conductance of the fluid medium. Use of the output of winding 18 as a reference voltage eliminates the effect of changes in excitation voltage from oscillator 24 and the core characteristics of core 12 because the induced voltage in winding 18 is a function of both these characteristics.

Winding 22 is connected at a point in the circuit as a part of a negative feedback loop utilized to balance out the flux of core 14 and to eliminate the effect of changes of the characteristics of core 14. The reference voltage $E_r$ and the output voltage $E_o$ are compared in comparison means 32 which produces an output signal O which is a measure of the conductivity of the fluid medium. Comparison means 32 may be a voltage to frequency converter which produces an output signal O whose frequency is a function of the ratio of the two input voltages and is therefore a measure of the conductivity of the fluid medium. Comparison means 32 may also be the circuit of FIG. 3 wherein the output voltage $E_o$ and the reference voltage $E_r$ are applied to the terminals 34 and 36 respectively.

Adjustable arm 42 is moved along resistor 40 until meter 38 indicates a null. At null $R_2/R_1+R_2$ is proportional to the conductivity of the fluid medium. Suitable readout arrangements which are not a part of the invention may be employed to provide a direct reading of conductivity of the fluid medium.

FIG. 2 is a more detailed block diagram of the invention. Oscillator 24 provides a sinusoidal output whose frequency is in the midrange of the transformer response (nominal 1000 Hertz). The output of oscillator 24 is connected to amplifier 25 whose output voltage is preferably controlled at a constant value and which applies excitation to winding 16. A voltage is induced in winding 18 which is connected to the input of conversion means 28. Conversion means 28 is preferably an absolute value amplifier (full wave rectifier) such as has been shown and described in Fairchild Semiconductor Linear Integrated Circuits Applications Handbook by James N. Giles (Library of Congress Catalog Number 67-27446) on pages 150 and 151. The output of amplifier 28 is DC reference voltage $E_r$.

A voltage is also induced in winding 20 due to the coupling link 26 (the conductivity of the fluid medium). Winding 20 is connected to the input of high gain, inverting amplifier 29 whose output is connected to the input of comparison means 30. Comparison means 30 is similar to comparison means 28 and its output is DC output voltage $E_o$. Amplifier 29 is a fixed gain, high gain, inverting, voltage amplifier whose input impedance is sufficiently high (preferably several hundred megohms) so that it does not load down the winding 20.

As just described $E_o$ will be a function of the conductivity of the fluid medium but it will vary with changes in the characteristics of core 14 due to temperature and other variables. To eliminate these effects, winding 22 is connected to the output of amplifier 29 through resistor 31. The winding 22 is positioned and connected so that the current produced in it by amplifier 29 and resistor 31 results in a flux in core 14 which is equal to and opposite to the flux produced by the fluid medium 26, thereby nulling the flux of core 14. In this configuration, the core is analogous to the summing point and "virtual ground" of an operational amplifier circuit comprised of core 14, winding 20, amplifier 29 and feedback elements resistor 31 and winding 22. As a result, $E_o$ is directly proportional to the conductivity of the fluid medium and the measurement errors due to core characteristics are minimized.

The voltages $E_o$ and $E_r$ may be compared either by means of a voltage to frequency converter or by means of the null method illustrated in FIG. 3.

While particular embodiments of the apparatus of the invention have been shown and described, it is apparent to those skilled in the art that modifications are possible without departing from the spirit of the invention and the scope of the subjoined claims.

The embodiments of the invention in which an exclusive property or privilege is claimed are defined as follows:

1. A conductivity sensor for measuring the conductivity of a fluid comprising:
   a first toroidal core and a second toroidal core placed in juxtaposition and immersed in the fluid;
   a first winding and a second winding wound on the first toroidal core;
   a third winding and a fourth winding wound on the second toroidal core;
   a source of alternating current connected to the first winding to thereby cause an alternating current to flow therein and to induce an alternating current in the second winding through inductive coupling in the first toroidal core and in the third winding through inductive coupling in the fluid;
   first conversion means whose input is connected to the second winding so as to produce a reference voltage at the output of the first conversion means;
   second conversion means whose input is connected to the third winding so as to produce an output voltage at the output of the second conversion means;
   the fourth winding being connected to the output of an amplifier whose input is connected to the third winding so as to produce a negative feedback flux which eliminates the effect of the changes in the characteristics of the second toroidal core on the output voltage; and
   comparison means for comparing the reference voltage and the output voltage to produce a signal which is a function of the conductivity of the fluid.

2. The invention of claim 1 including:
   a resistor; and wherein
   the amplifier is connected between the third winding and the second conversion means;
   the resistor being connected in series with the output of the amplifier and the fourth winding.

3. The invention of claim 2 wherein the comparison means is a voltage to frequency converter having a frequency output which is proportional to the conductivity of the fluid.

4. The invention of claim 2 wherein the first conversion means is an absolute value amplifier.

5. The invention of claim 2 wherein the second conversion means is an absolute value amplifier.

6. The invention of claim 2 wherein the comparison means is a null detecting, voltage divider having a voltage output which is proportional to the conductivity of the fluid.

7. The invention of claim 1 wherein the first conversion means is an absolute value amplifier.

8. The invention of claim 1 wherein the second conversion means is an absolute value amplifier.

9. The invention of claim 1 wherein the comparison means is a null detecting, voltage divider having a voltage output which is proportional to the conductivity of the fluid.

10. The invention of claim 1 wherein the comparison means is a voltage to frequency converter having a frequency output which is proportional to the conductivity of the fluid.

11. The invention of claim 10 wherein the first conversion means and the second conversion means are absolute value amplifiers.

12. The invention of claim 9 wherein the first conversion means and the second conversion means are absolute value amplifiers.

13. The invention of claim 3 wherein the first conversion means and the second conversion means are absolute value amplifiers.

14. The invention of claim 6 wherein the first conversion means and the second conversion means are absolute value amplifiers.

UNITED STATES PATENT OFFICE
CERTIFICATE OF CORRECTION

Patent No. 3,603,873　　　　　　　　　Dated September 7, 1971

Inventor(s) Uldis Cirulis

It is certified that error appears in the above-identified patent and that said Letters Patent are hereby corrected as shown below:

Column 1, line 10, cancel "in" (first occurrence) and insert --an--

Column 2, line 50, cancel "comparison" and insert --conversion--; line 51, cancel "comparison" (both occurrences) and insert --conversion--

Signed and sealed this 28th day of March 1972.

(SEAL)
Attest:

EDWARD M. FLETCHER, JR.　　　　ROBERT GOTTSCHALK
Attesting Officer　　　　　　　　Commissioner of Patents